(No Model.)

A. W. WILSON.
APPARATUS FOR BLEACHING PAPER STOCK.

No. 322,665. Patented July 21, 1885.

Witnesses:
J. M. Morse
A. Keithley

Inventor,
Alexander W. Wilson,
by A. B. Upham,
His Attorney.

UNITED STATES PATENT OFFICE.

ALEXANDER W. WILSON, OF ELMWOOD, ILLINOIS, ASSIGNOR OF ONE-HALF TO H. P. TRACY, OF SAME PLACE.

APPARATUS FOR BLEACHING PAPER-STOCK.

SPECIFICATION forming part of Letters Patent No. 322,665, dated July 21, 1885.

Application filed May 25, 1885. (No model.)

*To all whom it may concern:*

Be it known that I, ALEXANDER W. WILSON, of Elmwood, in the county of Peoria, in the State of Illinois, have invented an Improvement in Paper-Stock Apparatus; and I do hereby declare that the following is a full, clear, and exact description thereof, reference being had to the annexed drawings, making a part of this specification, in which like letters of reference refer to like parts, and in which—

Figure 1:
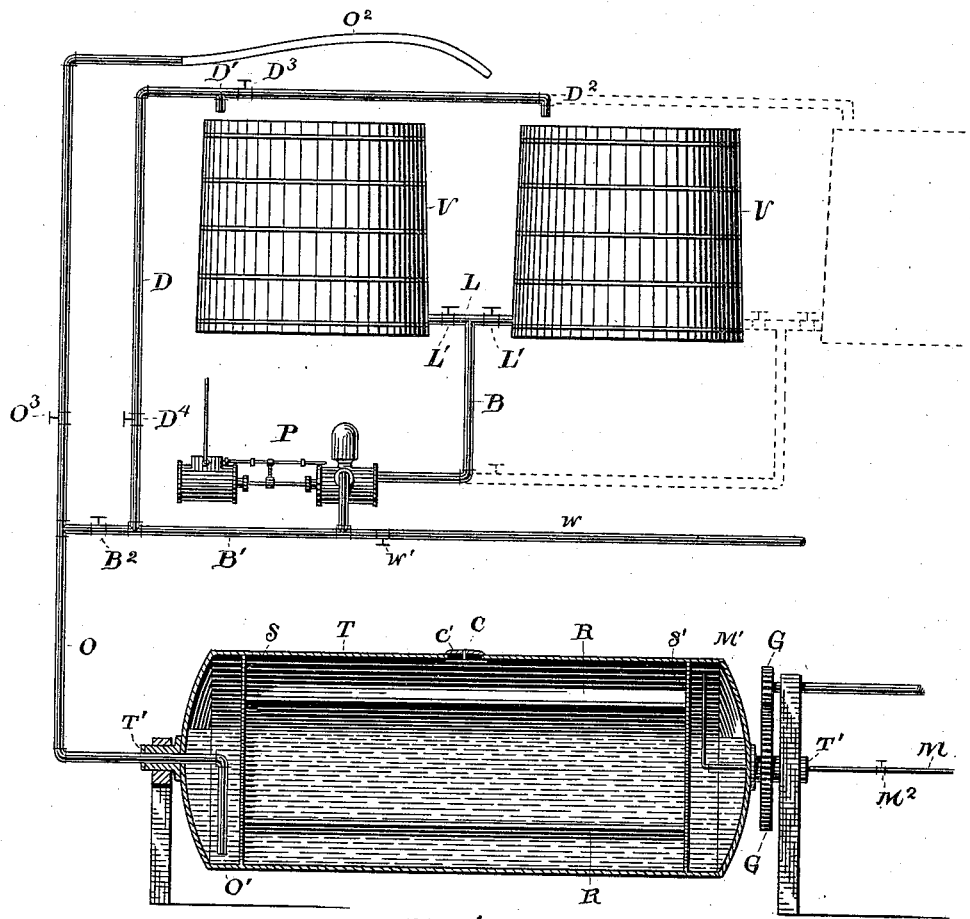
Figure 2:
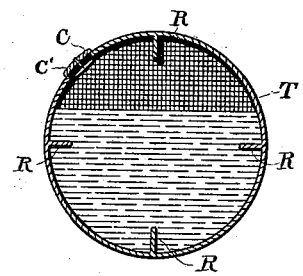

Figure 1 represents an elevation of a portion of the apparatus and a sectional view of the remainder. Fig. 2 is a cross-section of the rotary boiler.

This invention is in the line of apparatus for bleaching straw to adapt the same for the manufacture of straw paper; and my invention relates, first, to such an arrangement of the bleaching-vats as to require the minimum amount of labor in transferring the lime-liquor from one vat to another; second, to an improved means for dissolving the chemicals and forcing the solution to the bleaching-vats.

To economically transfer the lime-liquor which has just completed the bleaching of the straw in one vat from this vat to another, wherein it can act upon a fresh supply of paper-stock, I unite two or more bleaching-vats by means of a short horizontal pipe passing from one to another at the lowest points thereof. Through this link-pipe the lime-liquor in one vat can find its level in both; and to further transfer the same I run a branch pipe from said link-pipe to a pump, by which the remainder of the liquor in the vat to be emptied can be drawn therefrom and discharged into the other bleaching-vat, the entrance from the latter vat into said link-pipe being closed.

My improved chemical-dissolving apparatus consists of a tank adapted to be revolved upon a horizontal axis; of steam-inlet and liquor-exit pipes, so arranged as to enable the pressure of the entering steam to force the liquor contained in said tank out therefrom to the bleaching-vats; and of screens for filtering from the outflowing liquor the dirt and other sedimentary matter accumulating therein.

In the drawings, V V are the bleaching-vats; L, the link-pipe connecting said vats. L' L' are valves for closing the entrances from said vats to said pipe. B is the branch pipe leading from said link-pipe to the pump P.

T is the rotary tank, made to revolve upon its trunnions by means of the gearing G, or other suitable mechanism. O is the liquor-outlet pipe passing out through one of said trunnions, and M is the steam-pipe entering the tank through the other of said trunnions. S is the screen for preventing the access of sediment to said liquor-outlet pipe.

The tank T, I prefer to make cylindrical in form and provide it with spherical heads, to the centers of which are affixed the trunnions T'. The man-hole C and the man-hole plate C' give access to the tank and permit the introduction therein of the chemicals. I usually have a platform just above this tank upon which the chemicals can be brought and from which they can be dumped through the man-hole into the tank. Within the tank and affixed to the cylindrical sides thereof are two or more horizontal ribs, R, by which, when the tank is revolved, the water and chemicals therein are more thoroughly agitated and said chemicals entirely dissolved. The outlet-pipe O passes on from the tank up above the bleaching-vats V, where it terminates in a hose-pipe by which the wetting down of the bleach is done. From the pump P passes the pipe B' to said pipe O, and from said pipe B' passes the discharge-pipe D, with branches D' D² communicating with the bleaching-vats.

W is a water-pipe opening into the pipe B'. W', B², O², D⁴, and D³ are valves closing the various pipes at the points indicated.

To enable the end of the steam-pipe M to be above the surface of the liquor in the tank so that pressure of the steam can be upon the surface of said liquor, and so force said liquor out through the outlet-pipe O, I have said pipe M terminate in the upwardly-reaching branch M' whose end is almost in contact with the cylindrical side of the tank. By furnishing the pipe O with the branch O', extending downward nearly to the side of the tank, all or nearly all the lime-liquor in the tank can be forced therefrom by the superincumbent pressure.

The operation of the apparatus is as follows: One vat V having had its contained straw suitably acted upon by the lime-liquor, and the other vat being empty, the valves L' are opened and the said liquor in the former vat allowed to flow therefrom through the link-pipe L to the empty one until at the same height in each. The flow then of course ceases, and I close the valve L' next to the previously-empty vat and set the pump P in operation. If the lime-liquor is comparatively strong, the valve B² is closed, and the valve D⁴ opened, and a portion of said liquor forced by said pump from the straw-filled vat through the pipe D to the other vat V into which, meanwhile, fresh straw is being dumped. The valves D⁴ and O³ are then closed and the valve B² opened, and the remainder of said lime-liquor pumped into the tank T, through the pipe O. Having revolved the tank T sufficiently to cause the chloride of lime therein to dissolve and give the needed strength to the lime-liquor, the valve B² is closed, the valve O³ opened and the steam let into the tank through the pipe M. The liquid contents of the tank, suitably strained by means of the screen S, are forced therefrom by the steam-pressure through the pipe O, the upper end of which terminates in a hose-pipe, O². By means of said hose-pipe the issuing lime-liquor is directed to every part of the fresh straw until the same is completely wet down, when the steam is shut off. The bleached straw being removed from its vat, said vat is ready to be resupplied, in the same way as that described, so soon as the bleaching process is completed in the other vat. The mouths of the link-pipe L are of course provided with suitable screens to prevent the entrance of the straw.

In the drawings, the bleaching-vats, the pump, and the tank are represented as upon different levels, but they can as well be on the same floor.

To introduce water into the tank T to make up for loss, the valve W' of the water-pipe W is opened and the water allowed to flow in through the pipes B' and O.

More than two vats V can be connected together, as shown by the dotted lines, indicating a third vat and the linking-pipes.

By having the vats V above the tank T, as shown, and joining the pipe B directly to the pipe B', the pump P may be dispensed with, the lime-liquor flowing by gravity from the vats to the tank.

To remove the sediment from the tank, I open the man-hole C and revolve the tank until said man-hole is at the bottom. The sedimentary matter can then be scraped up and dumped out through the opening.

What I claim as my invention, and for which I desire Letters Patent, is as follows, to wit:

1. The combination, in a paper-stock apparatus, of two or more bleaching-vats united at their bottoms by the link-pipes provided with valves for closing their entrance into said vats, as and for the purpose specified.

2. The combination, in a paper-stock apparatus, of two or more bleaching-vats united at their bottoms by the link-pipes provided with valves for closing their entrance into said vats, and having the branch pipes leading from said link-pipes to a pump provided with the discharge-pipe, whereby the contents of one vat can be conveyed to another, substantially as and for the purposes set forth.

3. In a paper-stock apparatus, a tank adapted to revolve upon horizontal axes and having means for rotating it, in combination with steam-inlet and liquor-outlet pipes, substantially as and for the purpose set forth.

4. In a paper-stock apparatus, a tank having a man-hole through the side thereof and a man-hole plate, and adapted to be revolved upon a horizontal axis, in combination with the steam-inlet pipe passing through an axis of said tank and having the upwardly-projecting branch, and the liquor-outlet pipe passing through the other axis and having the downwardly-bent end, substantially as and for the purpose specified.

5. In a paper-stock apparatus, the tank adapted to be revolved upon suitable trunnions, and having the man-hole and man-hole plate, and provided with the longitudinal ribs and the transverse screen, in combination with the steam-inlet and liquor-outlet pipes, substantially as described, for the purposes specified.

6. In a paper-stock apparatus, the combination, with the bleaching-vats V, the link-pipe L, joining said vats, valve L' for said link-pipe, the branch pipe B, communicating with the liquor-outlet pipe O, and the valves B² O³, in combination with the tank T, adapted to be revolved upon its trunnions T', said pipe O passing through one of said trunnions and terminating in the depressed end O', and said tank being provided with the longitudinal ribs R, the screen S, the man-hole and man-hole plate, and having the terminally-elevated steam-pipe M passing through its other trunnion, substantially as set forth, for the purposes specified.

7. In a paper-stock apparatus, the tank T, adapted to be revolved upon its trunnions T', and having the man-hole C through its side, and a man-hole plate, C', therefor, and provided with the ribs R and the screens S, in combination with the terminally-elevated steam-pipe M, entering through one of said trunnions, the terminally-depressed liquor-outlet pipe O, passing out through the other of said trunnions, the bleaching-vats V, the link-pipe L, joining said vats and having valves L', the pump, the branch pipe B, uniting said link-pipe and pump, the pipe B', communicating from said pump to said pipe O, the pipe D, branching from said pipe B' and adapted to discharge into either of said vats, and the valves B², O³, and D⁴ for said pipes B', O, and D, as and for the purpose set forth.

In testimony that I claim the foregoing as my invention I have hereunto set my hand this 18th day of May, 1885.

ALEXANDER W. WILSON.

In presence of—
CHAS. HARKNESS,
E. E. HARDING.